(12) United States Patent
Baynton et al.

(10) Patent No.: US 6,277,030 B1
(45) Date of Patent: Aug. 21, 2001

(54) GOLF SWING TRAINING AND CORRECTION SYSTEM

(76) Inventors: Barr L. Baynton, 206 Box Oak, San Antonio, TX (US) 78230; William Clay Flannigan, 9830 Camino Villa #1126, San Antonio, TX (US) 78250

( * ) Notice: Subject to any disclaimer, the term of this patent is extended or adjusted under 35 U.S.C. 154(b) by 0 days.

(21) Appl. No.: 09/305,585

(22) Filed: May 5, 1999

(51) Int. Cl.$^7$ ........................................... A63B 69/36
(52) U.S. Cl. ........................... 473/219; 473/221; 473/226; 434/252
(58) Field of Search ........................... 473/219, 221, 473/222, 223, 226, 257, 258; 434/247, 252

(56) References Cited

U.S. PATENT DOCUMENTS

| | | | |
|---|---|---|---|
| 3,876,212 | 4/1975 | Oppenheimer | 273/186 |
| 4,326,718 | 4/1982 | Kiehl | 273/183 |
| 5,242,344 | 9/1993 | Hundley | 482/93 |
| 5,439,225 | 8/1995 | Gvoich et al. | 273/186.1 |
| 5,638,300 | 6/1997 | Johnson | 364/551.01 |

*Primary Examiner*—Kien T. Nguyen
(74) *Attorney, Agent, or Firm*—Jenkens & Gilchrist, A Professional Corporation

(57) ABSTRACT

An athletic implement swing training and correction system includes a computer controlled mechanical manipulation mechanism for controlling the position and orientation of the athletic implement within a predetermined swing path geometry. The predetermined athletic implement swing path position and orientation is tailored to the physiology of the individual athlete from a collection of swing path geometries. A system of computer controlled position control actuators guide the swing of the student athlete through a tailored swing path geometry. Deviations from the tailored swing path geometry result in force feedback to the student athlete in direct relation to the amount of deviation from the tailored swing path position and implement orientation.

44 Claims, 15 Drawing Sheets

GOLF SWING TRAINING AND CORRECTION SYSTEM

FIELD

The present invention pertains to systems for teaching and improving an athlete's swing of an implement such as a golf club, a tennis racket, a baseball bat or a cricket bat, etc. For clarity, the present invention is explained as a system for demonstrating a selected swing to a student golfer and assisting the student golfer in practicing the selected swing.

BACKGROUND

Those professionals involved in teaching beginning golfers how to swing a golf club or retained to improve the skills of seasoned golfers have discovered that the creation of "muscle memory" in a student golfer is an effective way of teaching a golf swing for maximum ball travel distance and directional accuracy. Specifically, if a student golfer repeats the desired swing of a golf club multiple times, the student golfer will be able to replicate the feel of the desired golf swing by the use of "muscle memory." That is, if a golfer knows what a desired golf swing feels like, the student golfer will be able to replicate the feeling of that desired swing during actual play and achieve maximum ball travel distance and directional accuracy.

In many training situations, the golf teaching professional first observes and then makes verbal comments on the student golfer's swing of a golf club. After the training session, the student golfer is left on his/her own to practice the swing described by the teaching professional. If the student golfer properly practices the swing described by the golf teaching professional, the student golfer's "muscle memory" will cause the desired golf swing to be replicated on the golf course during actual play. However, if the desired golf swing is practiced improperly, the student golfer's "muscle memory" will retain a golf swing still in need of correction or modification.

Some teaching golf professionals also assist student golfers by first demonstrating problems with the student golfer's swing and then showing the student golfer how to make the needed corrections. Some golf teaching professionals actually swing a golf club together with the student golfer. Unfortunately, this teaching method has proven to be ineffective in providing repeatable results and imperfect in teaching an effective swing. Swinging a golf club together with a student golfer is teaching a method designed to begin the process of imparting the feel of a proper swing into the student golfer's "muscle memory." However, following such swing demonstrations the student golfer is then left on his/her own to practice the desired swing. Unfortunately, if the student golfer is unable to frequently practice the swing demonstrated by the teaching golf professional, "muscle memory" will fade and eventually become lost.

One of the most difficult instructional situations for a golf teaching professional occurs when teaching the beginning student golfer how to swing a golf club as there is no foundation upon which to build muscle memory for a proper golf swing. In this situation, the golf teaching professional's goal is to cause the student golfer to develop a repeatable single swing pattern. Hopefully, this repeatable single swing pattern will cause the head of the golf club to strike the golf ball consistently. A second difficult instructional situation occurs when the golf teaching professional is called upon to correct or improve the swing of an experienced golfer. Typically, such experienced golfers have a well developed swing that may be defective or ineffective. In yet another instructional situation, the golf teaching professional is called upon to assist a golfer in changing the geometry of a golf swing and the orientation of the golf club during the swing due to a change in body size, body flexibility or muscle tone. In such cases, the need arises to select a new swing geometry from one of several possibilities to determine which golf swing geometry feels best to the experienced golfer and consistently produces the best results in ball travel distance and directional accuracy.

In still other instructional situations, some golfers find the need to develop multiple swing patterns which can be used with different clubs or in different playing situations. To determine which golf swing pattern best suits the golfer's playing style and body physiology, there is a need to be able to demonstrate to the golfer a variety of different swing patterns. The golfer can then select the golf swing pattern or geometry to be practiced.

Effectively meeting the foregoing instructional needs requires implementation of a system which can repeatedly and consistently demonstrate to the student golfer the best way to swing a golf club. In recent years there have been attempts to meet this need by the creation of various machines which were designed to repetitively force the student golfer to swing a golf club through a certain range of motion. Such prior art machines provide the student golfer the opportunity to build "muscle memory," but not for all motions of the swing and in many cases not entirely correct motions for a real human golf swing. Additionally, there is also a need to provide the student golfer with both "real time" and delayed feedback on where and how much the student golfer's swing path and club orientations deviate from the desired swing path and club orientations.

U.S. Pat. No. 3,876,212 describes an apparatus which a beginning golfer may use to learn how to swing a golf club. The device described in U.S. Pat. No. 3,876,212 enables a golfer to practice the basic movement of a golf swing by providing a computer controlled mechanism for controlling the movement of a golf club throughout its swing path. However, U.S. Pat. No. 3,876,212 falls short of providing control along all of the six degrees of freedom associated with the positioning and orientation of a golf club through the swing. Specifically, no provision was made in U.S. Pat. No. 3,876,212 for computer control of the rotation of the golf club about the long axis of the golf club shaft as occurs in an actual golf swing. This deficiency may make it difficult for a beginner golfer to learn the orientation of the golf club during the portion of a golf swing which is often called the "release." For many golfers, learning the "release" portion of the golf swing is the most difficult part of learning how to swing a golf club. Further, the device described in U.S. Pat. No. 3,876,212 does not provide for arbitrary positioning of the golf club and calculation of a desired swing path and club orientation based on an arbitrary positioning of the golf club.

Other prior art patents describing machines for assisting a golfer in learning how to swing a golf club, include:

U.S. Pat. No. 5,439,225
U.S. Pat. No. 5,242,344
U.S. Pat. No. 4,326,718
U.S. Pat. No. 4,280,701

Like U.S. Pat. No. 3,876,212, each of the foregoing four U.S. patents all use a predetermined single swing path with some adjustability. But, as previously indicated, a predetermined single swing path may not be suitable for all golfers. In addition, the mass and friction forces associated with prior art golf swing teaching machines may be so great as to provide an artificial feel to the swing as the golfer experiences the forces required to move the machine and overcome friction while guiding the golf club through a swing path.

Accordingly, a need remains in the art for a golf swing training and correction system to completely replicate the position and orientation of a golf club through all portions of a golf swing; a system that can be used to create a golf swing path and club orientation irrespective of the size or stature of the student golfer based on an arbitrary position of the golf club; and a system that minimizes the inertial and friction forces associated with the machinery used to hold the golf club and guide it through a predetermined golf swing path or geometry.

SUMMARY

The Golf Swing Training and Correction System of the present invention completely replicates all portions of a golf swing while minimizing the effect of the machinery used to hold the golf club and guide it through a predetermined golf swing path or geometry. In addition, the system of the present invention may be programmed to teach multiple different golf swing paths and the associated club orientations that are best suited for a golfer's skeletal and muscular structure.

The disclosed Golf Swing Training and Correction System is intended to be a teaching tool that enables both beginners and experienced golfers to impart a preselected swing path and the associated club orientation into muscle memory through positive feedback and repetition. This is accomplished by programming one of a selected array of swing path and the associated club orientations into the computer control of the mechanical portion of the system. This preselected swing path and the associated club orientations is modifiable by the software programmed into the computer control system to fit the skeletal and muscular structure of the student golfer.

The student golfer using the system of the present invention swings a golf club attached to the mechanical portion of the system. During this golf swing the computer control will monitor the club position and velocity throughout the entire swing path. If the club position and velocity cause a deviation from the desired swing path and associated club orientations, the computer control system applies corrective forces through all portions of the golf swing to influence the golfer's proper repetition of the predetermined golf swing path and associated club orientations. Such proper repetition of a predetermined golf swing path and associated club orientations will create the "muscle memory" that can be replicated by the student golfer when actually out on the golf course.

The Golf Swing Training and Correction System of the present invention includes a group of simple mechanical components whose movement, one with respect to another, is determined by computer controlled position control actuators. The computer control system precisely tracks, and guides, a golf club through the full range of the motion of a human golf swing. The software resident in the computer control system allows the golf swing practice system of the present invention to be adjustable to allow for a wide range of swing patterns and associated club orientations associated with the various body sizes and structures of student golfers.

Use of the system of the present invention is initiated by attaching the golfer's own golf club to a wrist assembly on the machine with the aid of a clasping device tightened around the club grip using thumbscrews. Each of the mechanical portions of the machine, which controls the movement of the golf club though a predetermined swing path and associated club orientations, is individually determined by a position control actuator.

The positions of the mechanical components of the present invention, through the use of the computer control system, are set to allow the student golfer to actively swing his/her golf club through a predetermined, exactly-defined, range of motion that precisely controls all movements or positions of the club that must be addressed throughout the entire human golf swing. This precise computer control allows the student golfer to actually swing a golf club through a "perfect," pre-set tailored path and associated club orientations—giving the student golfer the actual "feel" of that "perfect swing." The "perfect swing" to be learned by the student golfer is chosen from an array of golf swing paths and club orientations that have proven to be effective for the lowest scoring golfers. Thus, by causing the student golfer to repetitively swing the golf club with the aid of the system of the present invention through the predetermined swing path and associated club orientations, muscle memory is enhanced and the student golfer's swing and resulting golf ball travel distance and directional accuracy improves. Additionally, when the effectiveness of an experienced golfer's swing deteriorates, use of the system of the present invention to replicate the experienced golfer's already defined and recorded most effective swing path and associated club orientations will help restore the golfer's desired swing path and associated club orientation to muscle memory.

The Golf Swing Training and Correction System can also be used by a person to swing a golf club without any predetermined or set swing. Specifically, the system of the present invention may be used as a golf swing motion recording device to precisely monitor and record (with the aid of sensors) all golf club movement and associated club orientations throughout the swing. This feature of the present invention allows for precise analysis of a golfer's actual swing, as well as precise duplication of the swing should such be necessary at a later time.

Because the Golf Swing Training and Correction System is position control actuated, which enables replicating every position and associated orientation that a golf club experiences during a golf swing, the system of the present invention can be used to analyze and test any golfer's swing. Thus the golf teaching professional will be able to assist the student golfer in determining the best swing for a given individual golfer to achieve maximum ball travel distance and directional accuracy.

Finally, since the golf Swing Training and Correction System includes computer controlled position actuators, utilization of the proper type of position control actuator will enable the system to actively swing a golf club without the presence of a human golfer. This feature will allow for the testing of golf equipment (e.g. clubs, balls) with a multitude of different, human golf swing geometries and club orientations.

BRIEF DESCRIPTION OF THE DRAWINGS

A better understanding of the Golf Swing Training and Correction System of the present invention may be had by reference to the drawing figures wherein:

FIG. 3-A is a side elevational view of the system shown in FIG. 3 with a portion of the support column broken away;

FIG. 3-B is a front elevational view of the system, shown in FIG. 3;

FIG. 3-C is a top plan view of the system shown in FIG. 3;

DESCRIPTION OF THE EMBODIMENTS

Figure 1:
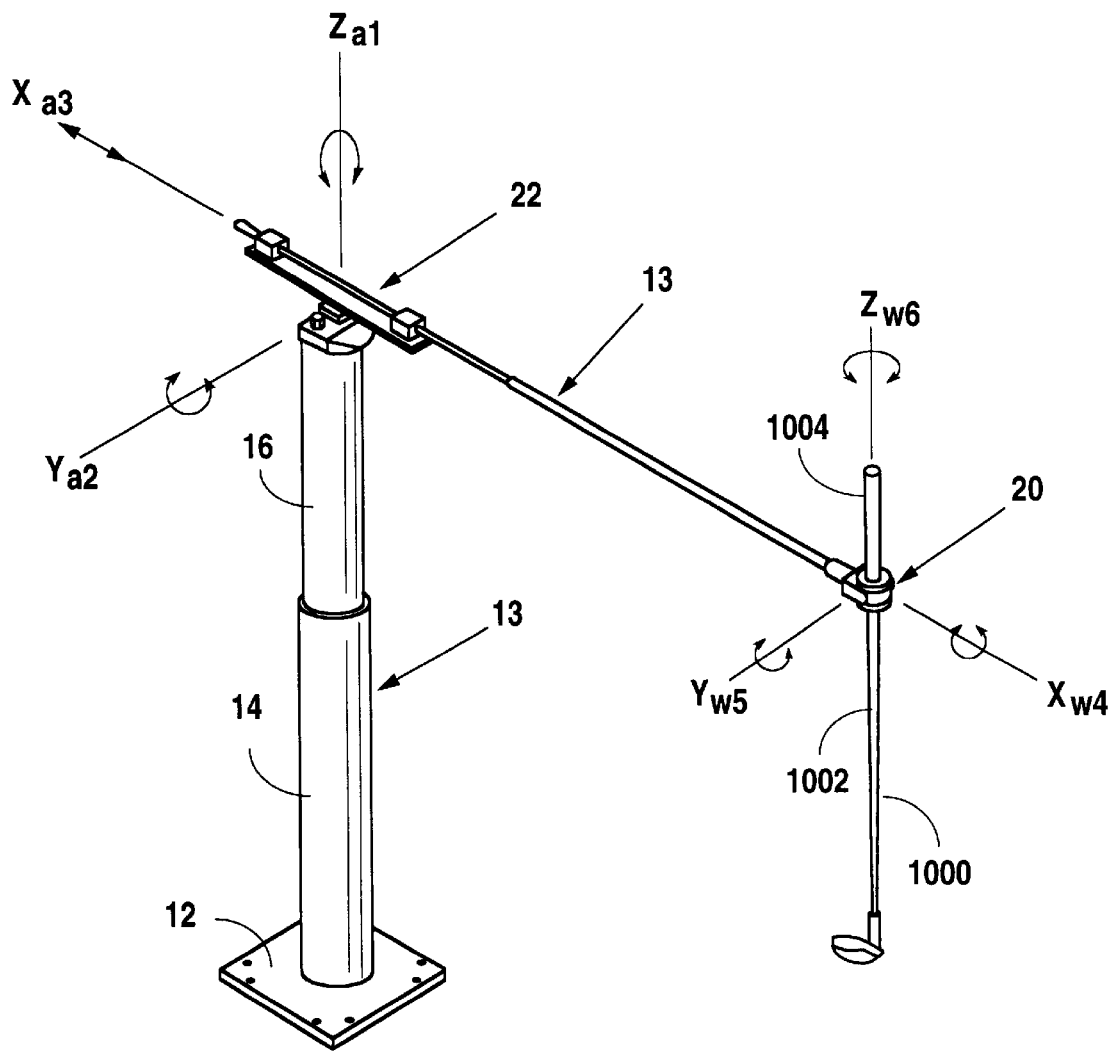
FIG. 1 is a perspective view of the basic structure of the Golf Swing Training and Correction System of the present invention without any position control actuators attached.

The mechanical components and the computer control system which implements the golf swing training and correction system of the present invention make up a device that will both physically guide and orient the position of a golf club through a predetermined golf swing path or geometry. The predetermined golf swing path and associated club orientations are selected based on both initially supplied parameters and real-time calculations. The function of both moving and orienting the position of a golf club through a predetermined swing path and pattern of associated club orientations is accomplished by attaching a mechanical manipulation mechanism to a golf club, monitoring the club's position and orientation in real time during the swing, and then rapidly supplying the necessary corrective forces by a set of computer controlled position control actuators to achieve the desired swing path and associated club orientations throughout the swing path.

General Description of the Mechanical Manipulation Mechanism:

The Golf Swing Training and Correction System of the present invention includes a computer controlled club positioning and orientation system in six degrees of freedom in a six degree-of-freedom mechanical manipulation mechanism. The combination of the mechanical manipulation mechanism and the computer control system enables the arbitrary positioning and orienting of a golf club throughout a golf swing path or geometry. Each one of the six degrees of freedom has a range of motion which is designed to accommodate a typical swing of a golfer. Further, each one of the six degrees of freedom is individually actuated to be able to apply corrective feedback forces to the student golfer. These corrective feedback forces modulate the path of the student golfer's swing.

At each of the six degrees of freedom are individual position control actuators which provide accurate position control of the mechanical manipulation mechanism. The term "position" control actuator is used to describe a device which has both motor and/or braking functions. One example of a position control actuator is a device included in the Baldor A-series. The position control actuators are selected to provide adequate torque to dynamically adjust a golfer's swing. A sensor such as a rotary resolver within the position control actuators is employed for sensing the position of the mechanical manipulation mechanism—and thus the position and orientation of the golf club throughout the entire golf swing path or geometry. While a rotary resolver is used to sense position, those of ordinary skill in the art will understand that a variety of other type sensors may be used without detracting from the operability of the invention.

To best replicate an actual golf swing, the mass, the rotational inertia, and the friction of the mechanical manipulation mechanism has been minimized. This close replication of a real golf swing by minimizing the forces associated with moving the mechanical manipulation mechanism which positions the golf club has been accomplished by passively compensating for mass loads and inertia using springs and/or counter-masses, as well as actively compensating for mass effects using motion control techniques within the computer control system.

The system of the present invention requires locating both the golfer's position and the position of the ball relative to the mechanical manipulation mechanism. Establishing this initial location may be accomplished through use of a platform that both positively fixes the location of the ball and indicates an appropriate standing position for the student golfer. For system mobility, the locating platform may be removable or collapsible.

The operating environmental conditions are primarily dictated by the operating conditions for the individual component electronics.

Mechanical safety features included in the preferred embodiment of the system of the present invention may include a "dead-man" switch on the golf club itself to provide an emergency stop for the system and shrouds over joints where pinching of exposed skin or catching of loose clothing may occur.

Description of the Computer Control System:

Due to the high-speed nature of a golf swing, and the need to first monitor the position of the mechanical manipulation mechanism and then to update the position control actuators in real-time, a rapid response computer control system is required. Because of the need for a rapid response, standard trajectory planning algorithms have not been used. Rather, the required rapid response is provided by access to the low level servo loop which controls the motion and orientation of the golf club.

The computer control system monitors the Cartesian coordinates associated with the golf club position throughout the entire swing path, and when the swing path or orientation of the golf club deviates from the predetermined path or associated club orientation, the nearest desired swing path position to the actual swing path position is calculated and then fed to a proportional-integral-derivative (PID) filter. In response to the output of the PID filter, a corrective force is applied to the golf club by the position control actuators acting on the mechanical manipulation mechanism. The amount of force applied to the golf club is in direct proportion to the amount of the deviation of the actual swing path or club orientation from the desired swing path or club orientation. This method of providing force feedback to the student golfer allows free motion of the golf club throughout the swing path and pattern of associated club orientations, while at the same time constraining the movement of the golf club so that it returns to the desired path by the applied force from the position control actuators which control the movement of the mechanical manipulation mechanism.

The computer control system hardware includes a standard architecture PC having six-axis motion control capability. Acceptable software packages to operate the computer control system hardware include Windows NT with real-time extensions, a real-time operating system such as Lynx® or Linux Rtos®, or running the control code on an embedded processor on the computer's six-axis motion control capability.

The general computer control system operation is based on a set of recorded desirable swing patterns. Such recorded desirable swing patterns may include the swing patterns of well known golfers. The selected swing path and associated club orientations may be put into the memory of the computer control system in a variety of different ways. One way of recording a swing path and club orientation is by actually moving the non-actuated mechanical manipulation mechanism through the desired swing pattern and then storing the set of Cartesian coordinates describing the swing pattern and club orientation in the memory portion of the PC. Alternatively, a pre-determined set of coordinates may be down loaded into the PC or a set of coordinates generated by another computer system, such as that illustrated in U.S. Pat. No. 5,638,300, may be used. Once a swing pattern is downloaded into the memory of the PC it may then be customized to best fit the stature of a specific student golfer. The swing customization parameters fed into the computer control system software for tailoring the swing pattern include height, club selection, arm length, etc. In addition, the level of force feedback that indicates to the student golfer the degree of conformity to the desired golf swing and associated pattern of club orientations also may be a parameter which can be programmed into the computer control system software.

In actual operation, the student golfer swings a golf club using his/her own muscle power. If the student golfer swings the golf club exactly along the predetermined path and associated club orientations, no force is applied to the golf club. However, if the student golfer deviates from the predetermined swing path and associated club orientations, a corrective restoring force, which is in direct proportion to the deviation of the actual swing path from the predetermined swing path and associated club orientations, is applied to the golf club by the mechanical control mechanism whose position is controlled by the torque exerted by the position control actuators which, in turn, are controlled by the computer control system software.

Club position and club orientation are sensed by the sensors associated with each position control actuator and then recorded by the computer control system throughout the entire swing for later analysis and visualization. Club velocity and acceleration are obtained simply by calculating the first and second time derivatives of the club's position and orientation along the club swing path.

If desired, safety controls such as an emergency stop may be included in the computer control system software for unexpected conditions such as large position errors or unstable computer control system operation.

Figure 2:
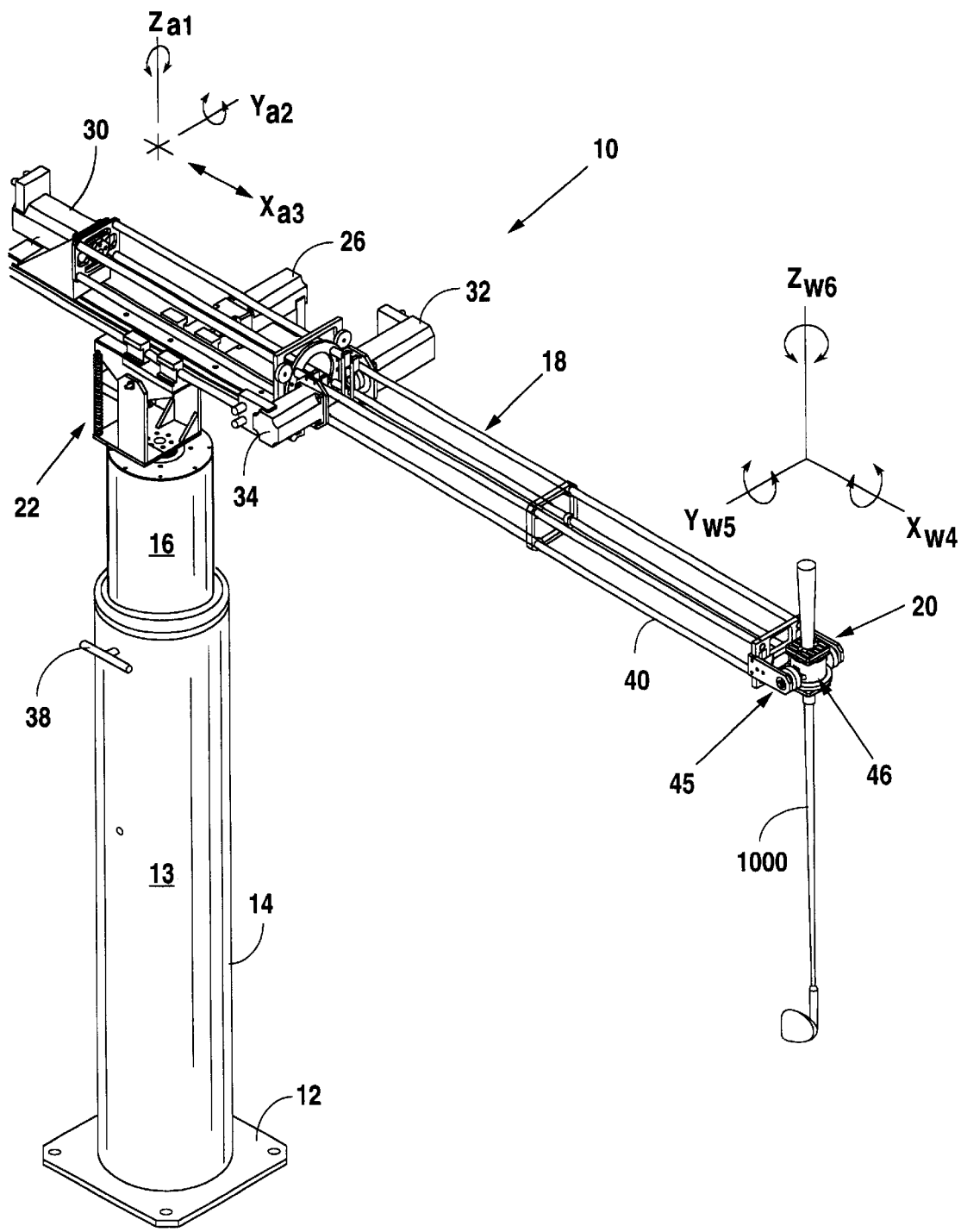
FIG. 2 is a perspective view of the system with the position control actuators attached thereto.

Construction of the Mechanical Manipulation Mechanism:

As shown in FIG. 1 and FIG. 2, the mechanical manipulation mechanism of the Golf Swing Training and Correction System 10 of the present invention is a six degree-of-freedom support assembly, serial-link, robotic manipulator. The mechanical manipulation mechanism, consists of a three degree-of-freedom support arm assembly 18 and a three degree-of-freedom wrist assembly 20. The three degree-of-freedom arm assembly 18 has two revolute joints and a prismatic joint. The three degree-of-freedom wrist assembly 20 contains three revolute joints.

The two revolute joints on the arm assembly 18 enable a first rotation of the arm assembly 18 with respect to the stationary base 12 of the system 10 along two axes. As shown in FIG. 1 and FIG. 2 these two axes are designated as $z_{a1}$, and $y_{a2}$. The prismatic joint on the arm assembly 18 enables translation along the $x_{a3}$ axis. The three revolute wrist joints on the wrist assembly 20 include rotation about the $x_{w4}$-axis, rotation about the $y_5$-axis, and rotation about the $z_{w6}$-axis. To better orient the reader, these six axes are shown in all drawing figures.

Student golfers of different heights may be accommodated by adjusting the height of the support column assembly 13 by sliding an inner cylinder 16 within an outer cylinder 14 and then mechanically locking 38 the two together. While a substantially vertical support column 13 is shown, other shapes may be used, such as an arc or a slanted column.

As shown in FIG. 2, motion along each of the designated 6 axes $z_{a1}$, $y_{a2}$, $x_{a3}$, $x_{w4}$, $y_{w5}$, and $z_{w6}$ is controlled by six position control actuators which act to restrain the motion of the mechanical manipulation mechanism by increasing the applied torque proportional to the error in its position. The placement of the position control actuators is shown in FIG. 2.

Specifically, the first position control actuator 24 (see FIGS. 3A and 5) controls rotation about the $z_{a1}$-axis. The second position control actuator 26 controls rotation about the $y_{a2}$-axis and the third position control actuator 28 (see FIG. 6) controls translation of the arm assembly 18 along the $x_{a3}$-axis. The fourth position control actuator 30 controls rotation about the $x_{w4}$-axis. Similarly, the fifth position control actuator 32 controls rotation about the $y_{w5}$-axis by a cable assembly (not shown) connected to the wrist assembly 20. The sixth position control actuator 34 controls rotation of the long axis of the shaft 1002 of the golf club 1000 about the $z_{w6}$-axis by a cable assembly (not shown) connected to the wrist assembly 20.

Figure 3:
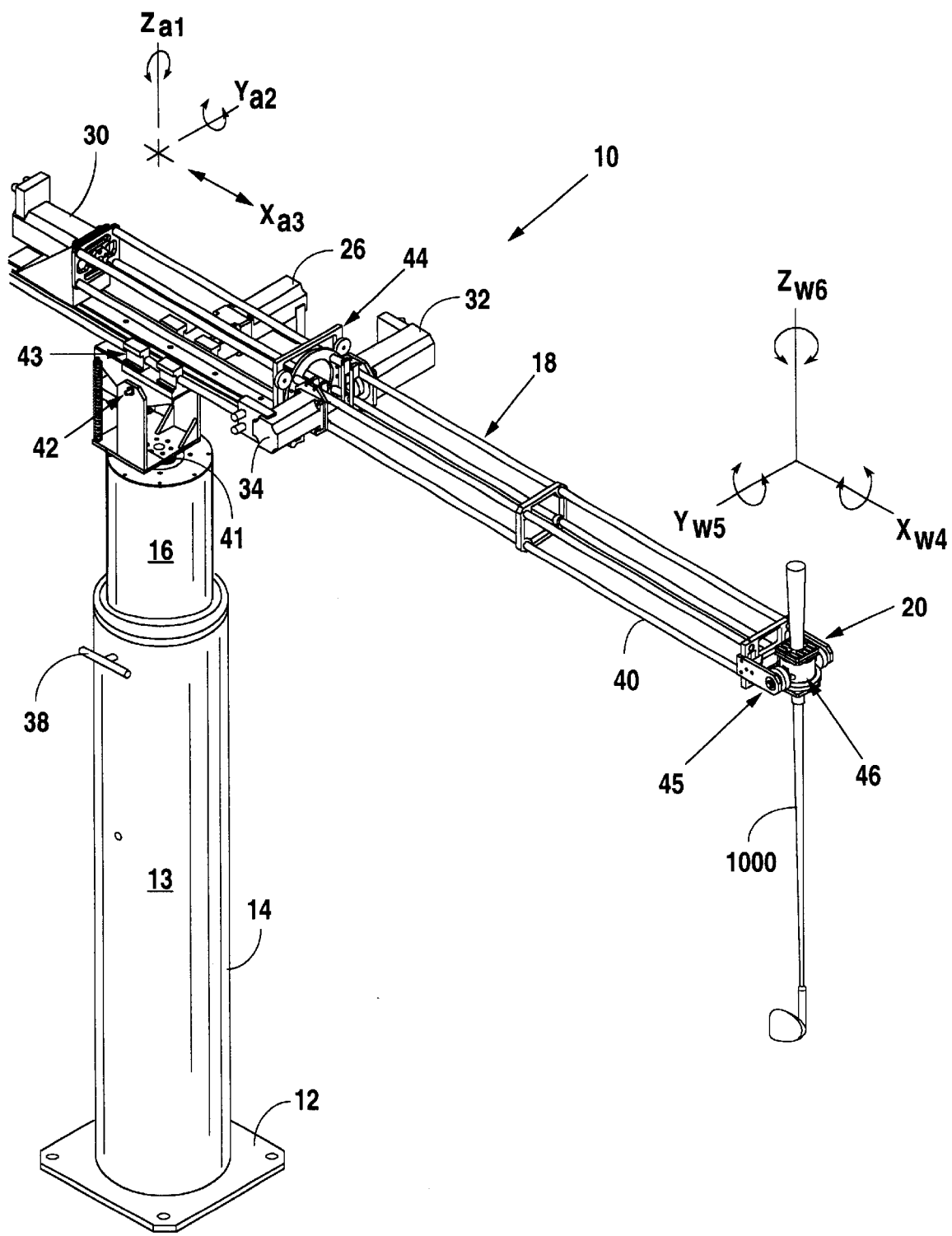
FIG. 3 is a perspective view of the system similar to that of FIG. 2 designating the major sub-assemblies and the location of the six joint assemblies.
Figure 3A:
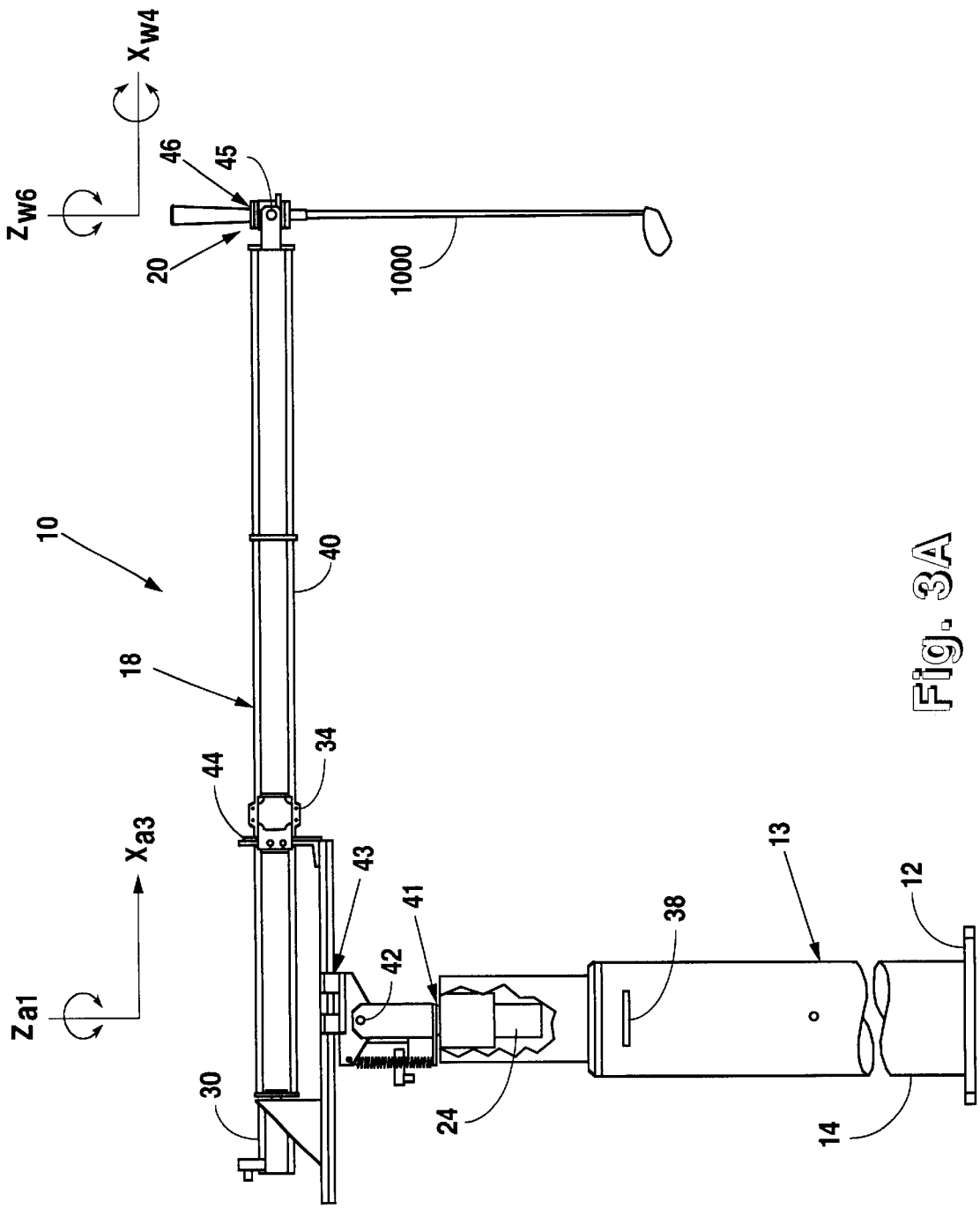
Figure 3B:
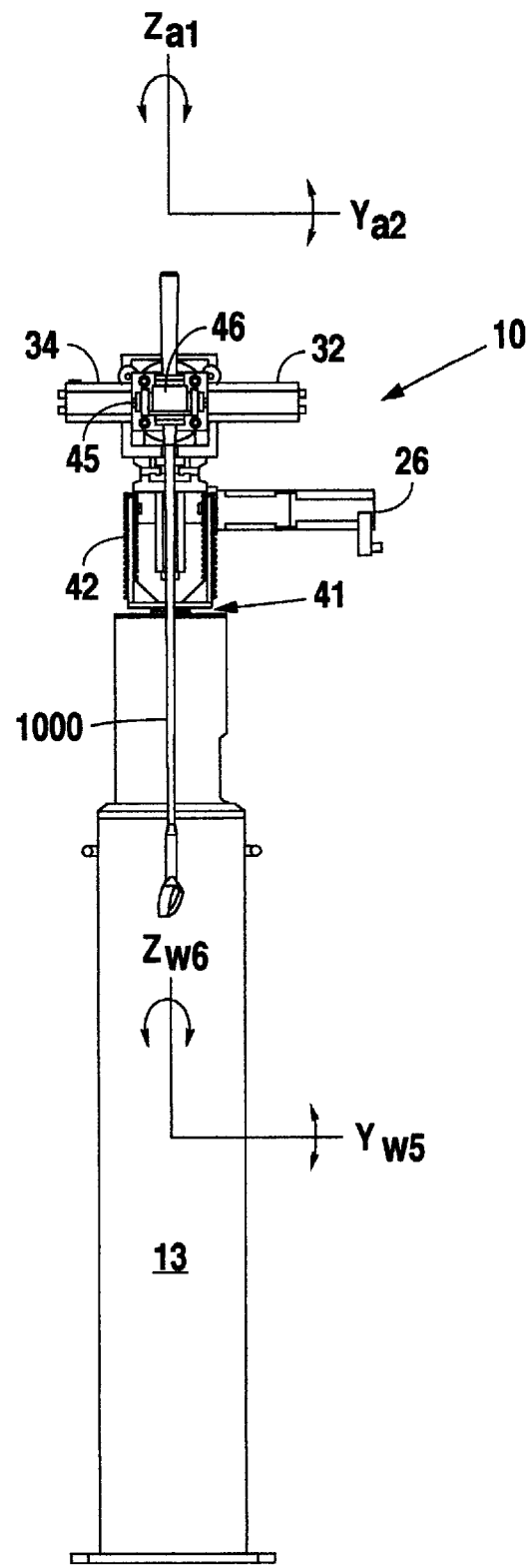
Figure 3C:
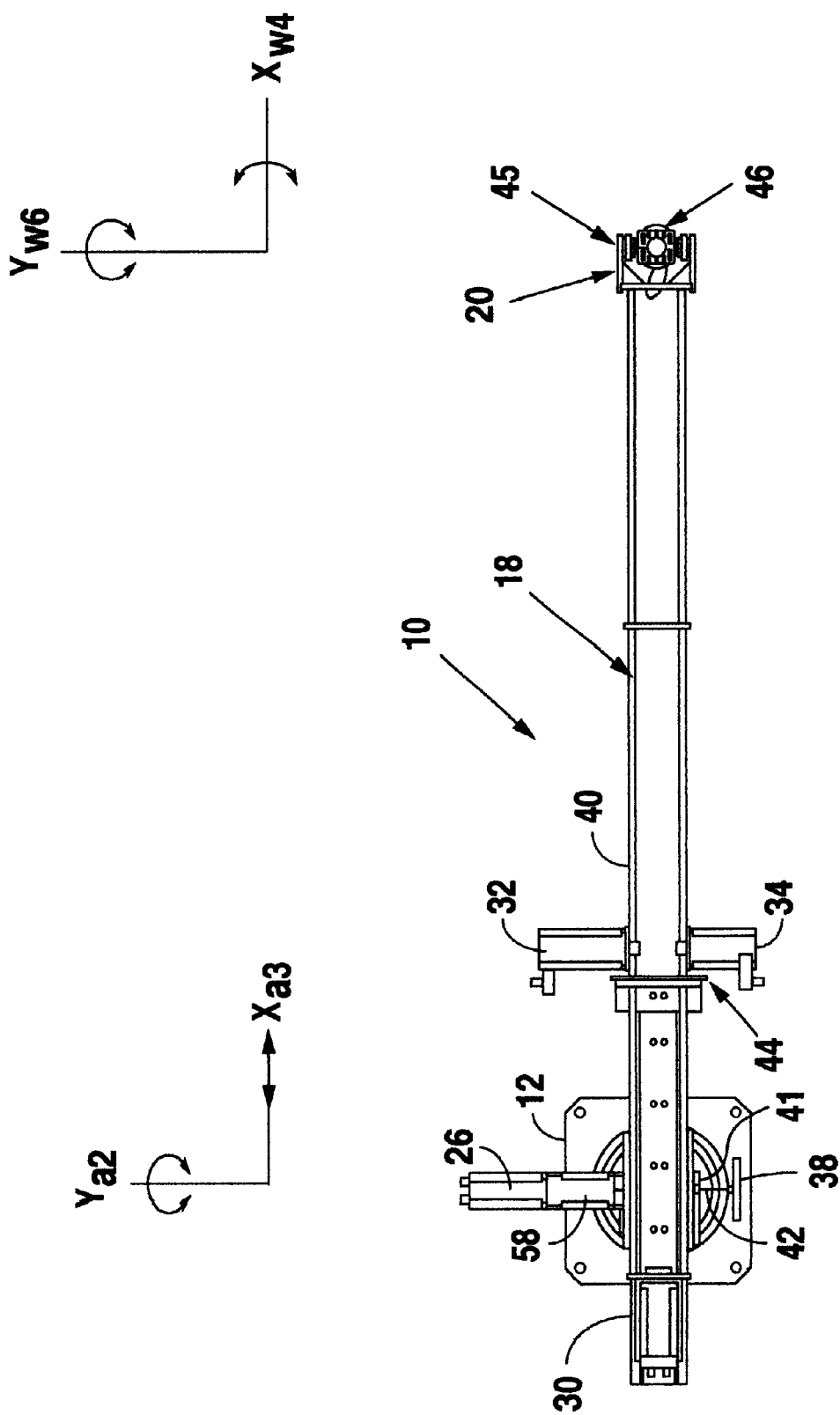

A still better understanding of the movements to be controlled by the mechanical manipulation mechanism of the present invention may be had by reference to FIGS. 3, 3-A, 3-B, and 3-C which illustrate the location of the six joint assemblies 41, 42, 43, 44, 45, and 46. Joint one 41 is located atop the support column assembly 13. Joint two 42, which controls the angle of the support arm assembly 13 with respect to the support column assembly 13, is located just over joint one 41. Joint three 43 is located just over joint two 42. Joint three 43 controls the distance between the golf club 1000 and the stationary support column assembly 13. Joint four 44 is located on the support arm assembly 18 between the stationary support column assembly 13 and the wrist assembly 20. Joint four 44 controls the angular orientation or roll of the wrist assembly 20. Joint five 45 is located in the wrist assembly 20 and controls the angular orientation or pitch of the golf club 1000 with respect to a vertical line. Finally, joint six 46 is also located within the wrist assembly 20 where it controls the rotation or yaw of the golf club 1000 within the wrist assembly 20.

Figure 4:
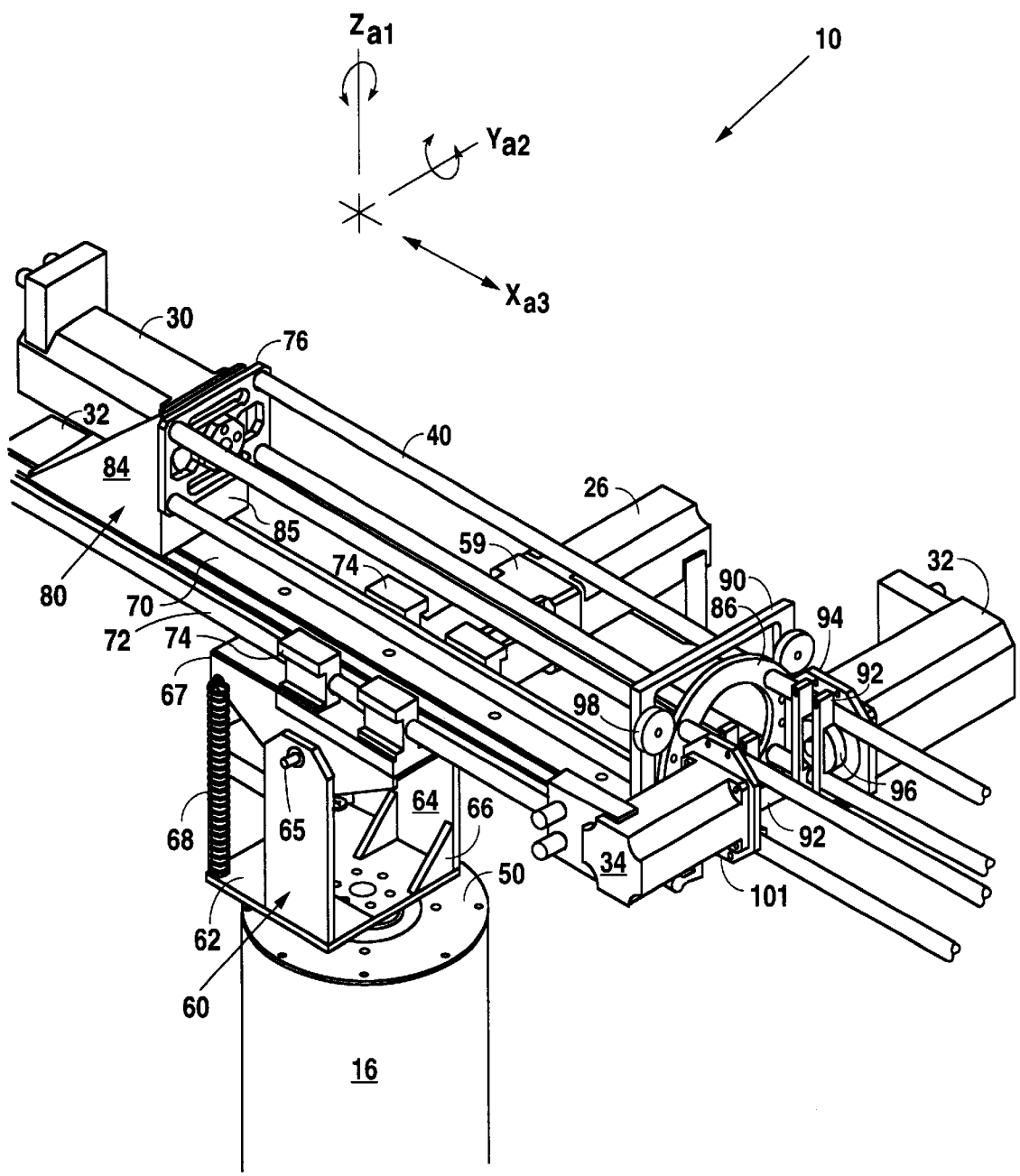
FIG. 4 is an enlarged perspective view of the position control actuator mountings.
Figure 5:
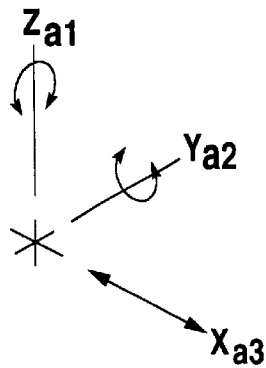
FIG. 5 is a partially exploded perspective view showing the sub-system which enables motion about axis 1.
Figure 5:
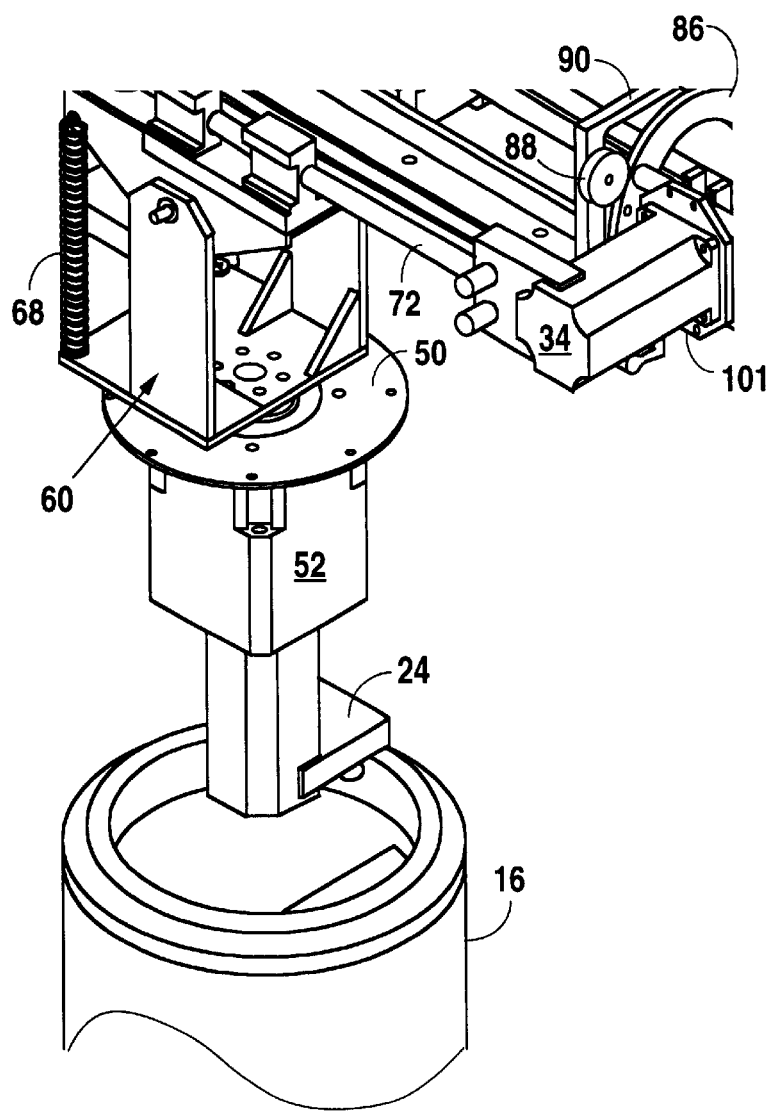

By reference to FIG. 4 and FIG. 5, the mounting and operation of joint one 41 along the $z_{a1}$-axis may be better understood. The first position control actuator 24 is located within the inner support column 16. It is connected thereto by a mounting bracket 50. The shaft of the first position control actuator 24 is connected to a 20:1 gear ratio reducer 52. The gear reducer 52 uses a planetary system with a table top output shaft system. This large table top output shaft system allows the first position control actuator 24 to be mounted directly to the gear reducer 52 without the need of providing an extra bearing for support. The table top output shaft system on top of the gear reducer 52 is connected to a rotatable motor mounting assembly 60. Accordingly, the first position control actuator 24 controls the rotation of the entire head assembly 22 around the $z_{a1}$ axis.

Figure 6:
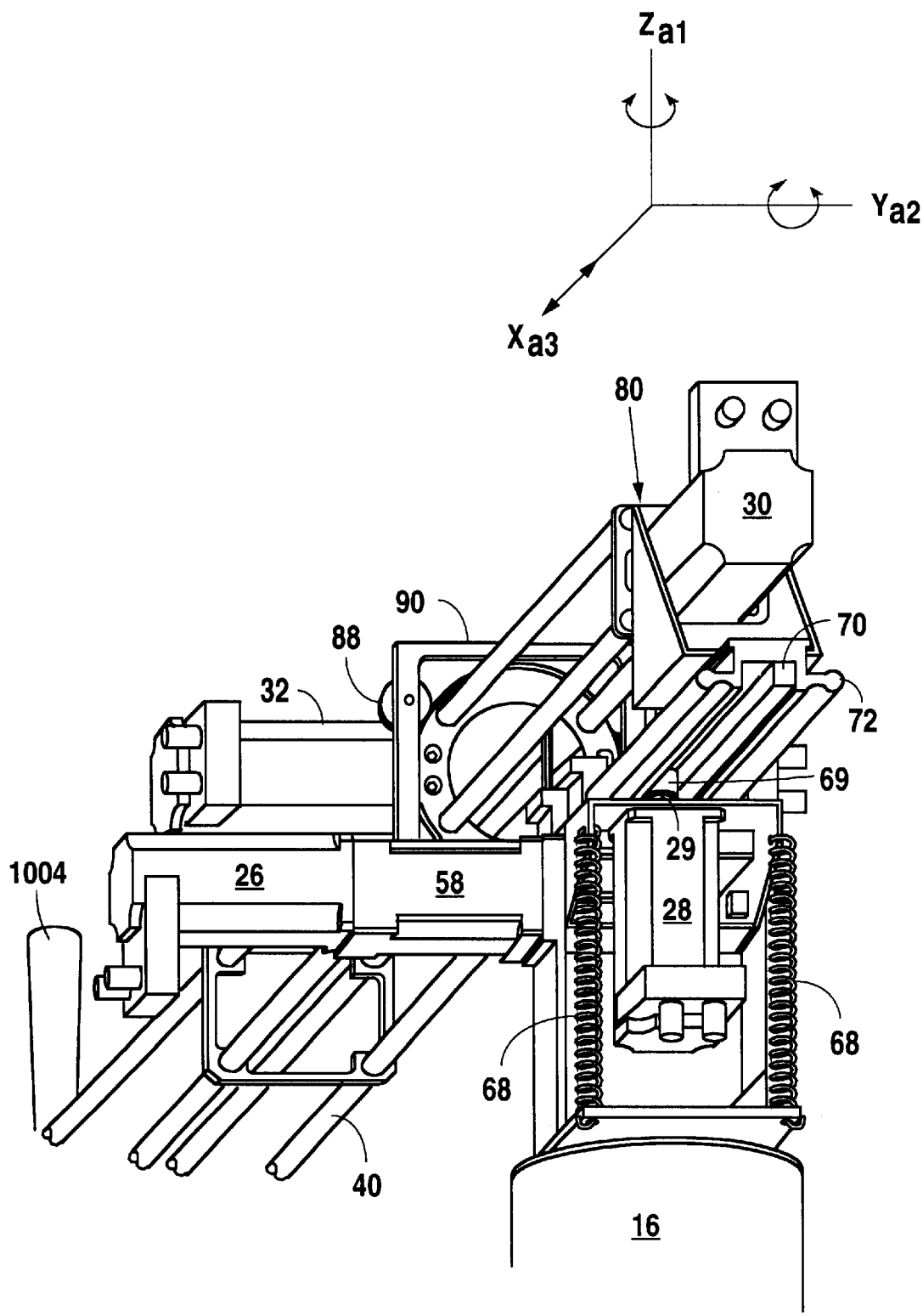
FIG. 6 is a partial perspective view from underneath the arm assembly showing the sub-systems which enable motion about axes 2 and 3.

By reference to FIGS. 4 and 6, it may be seen that the second position control actuator controls rotation about the $y_{a2}$ axis. Connected to the output shaft (not shown) of the second position control actuator 26 is a 20:1 gear ratio reducer 58. By further reference to FIGS. 4 and 6, it may be seen that the third position control actuator 28 is located within a rotatable motor mounting assembly 60.

As best seen in FIG. 4 the rotatable motor mounting assembly 60 includes a base plate 62 and side frames 64 which are held in position by braces 66. At the top of each side frame piece 64 is located a pivot hole 65 which is collinear with the output shaft of the second position control actuator 26. Biasing the pivotable support plate 67 portion of the position control actuator mounting assembly 60 in position with respect to the pair of side frame pieces 64 is a pair of springs 68.

As best seen in FIG. 6 a pinion gear 69 on the end of the output shaft 29 of the third position control actuator 28 engages teeth formed on a rack 70. This engagement with the teeth on the rack 70, in a prismatic joint, causes the rack 70 to move back and forth linearly along the $x_{a3}$ axis. Guiding the linear motion of the rack 70 along the $x_{a3}$ axis is a pair of circular guide surfaces 72 which are formed on either side of the rack 70. The two guide surfaces 72 pass through four guide blocks 74, two of which are located on either side of the rack 70.

Figure 7:
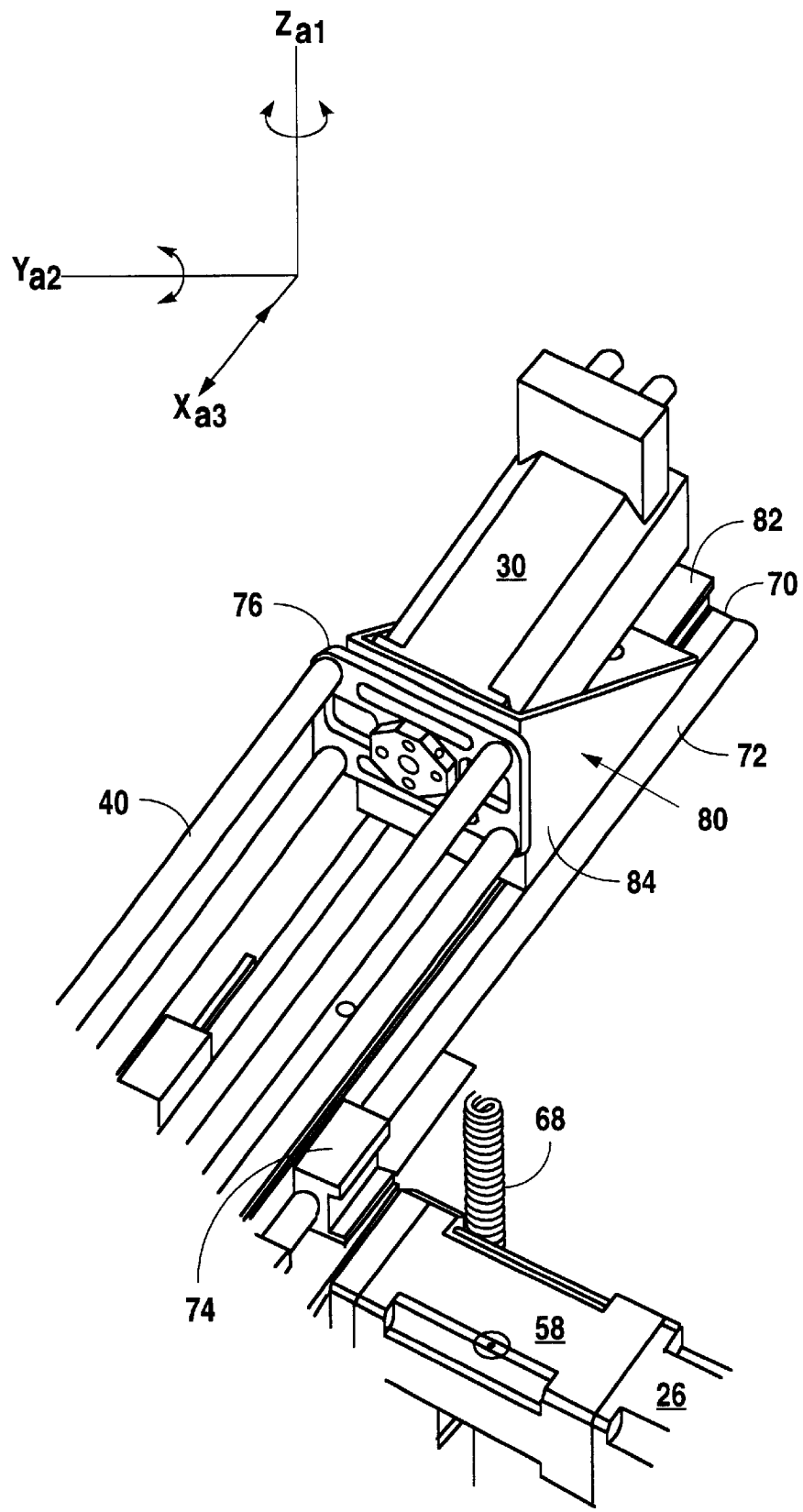
FIG. 7 is a partial perspective view from underneath the arm assembly showing the sub-system which enables motion about axis 4.

By reference to FIGS. 4 and 7, it will be seen that the fourth position control actuator 30 controls rotation about the $x_{a3}$ axis which is colinear with the $x_{w4}$ axis. Positioned on the end of the rack 70 is a mounting assembly 80 for the fourth position control actuator 30. The mounting assembly 80 includes a base 82 which is mounted to the rack 70, a pair of side pieces 84 and an end piece 85. The output shaft of the fourth position control actuator 30 engages a support rod mounting plate 76. Thus, as the output shaft of the fourth position control actuator 30 turns, the support rod mounting plate 76 will turn. As may be further seen in FIGS. 4 and 7, four support rods 40 are connected to the support rod mounting plate 76. Stabilizing the four support rods 40 is a ring 86 which is located adjacent the fifth position control actuator 32 and the sixth position control actuator 34. The position of the ring 86 is controlled by three guide wheels 88 which are mounted to a guide wheel frame assembly 90. The guide wheel frame assembly is affixed to the end of the rack 70. Thus, as the four support rods 40 are rotated by the fourth position control actuator 30 the ring 86 moves with respect to the guide wheel mounting frame assembly 90 and rotation about the $x_{w4}$, axis is controlled.

Figure 8:
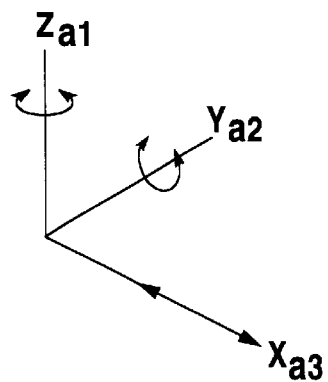
FIG. 8 is a partial enlarged perspective view from underneath the arm assembly showing the sub-systems which enable rotation about axes 5 and 6.
Figure 8:
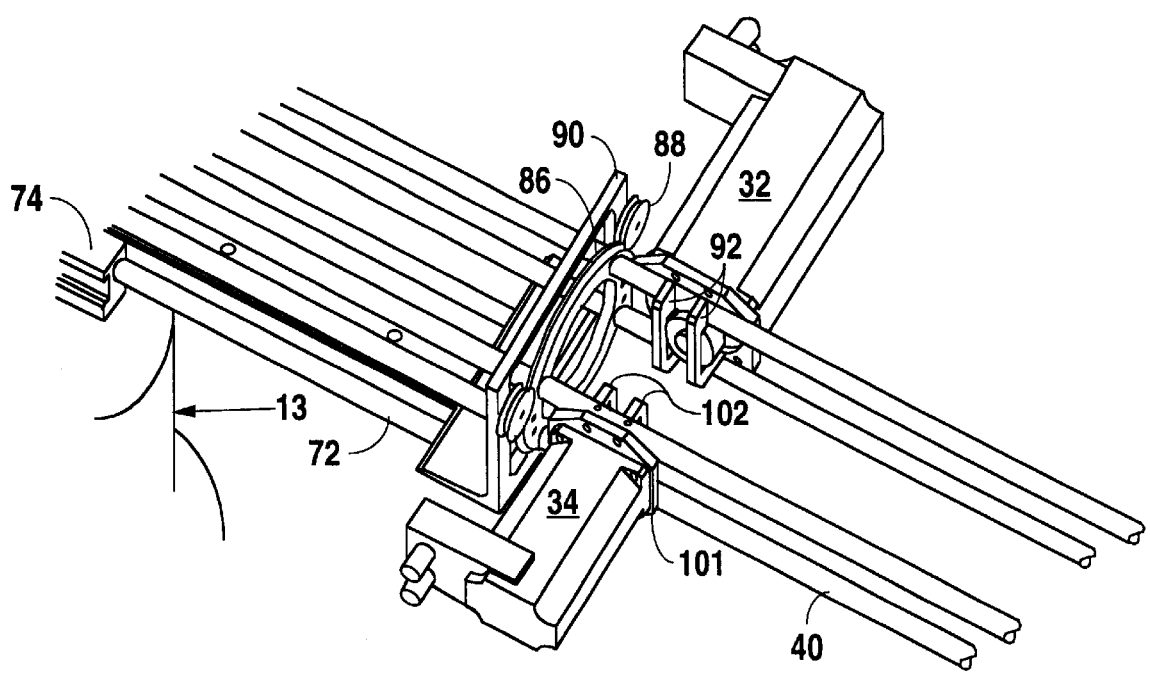
Figure 9:
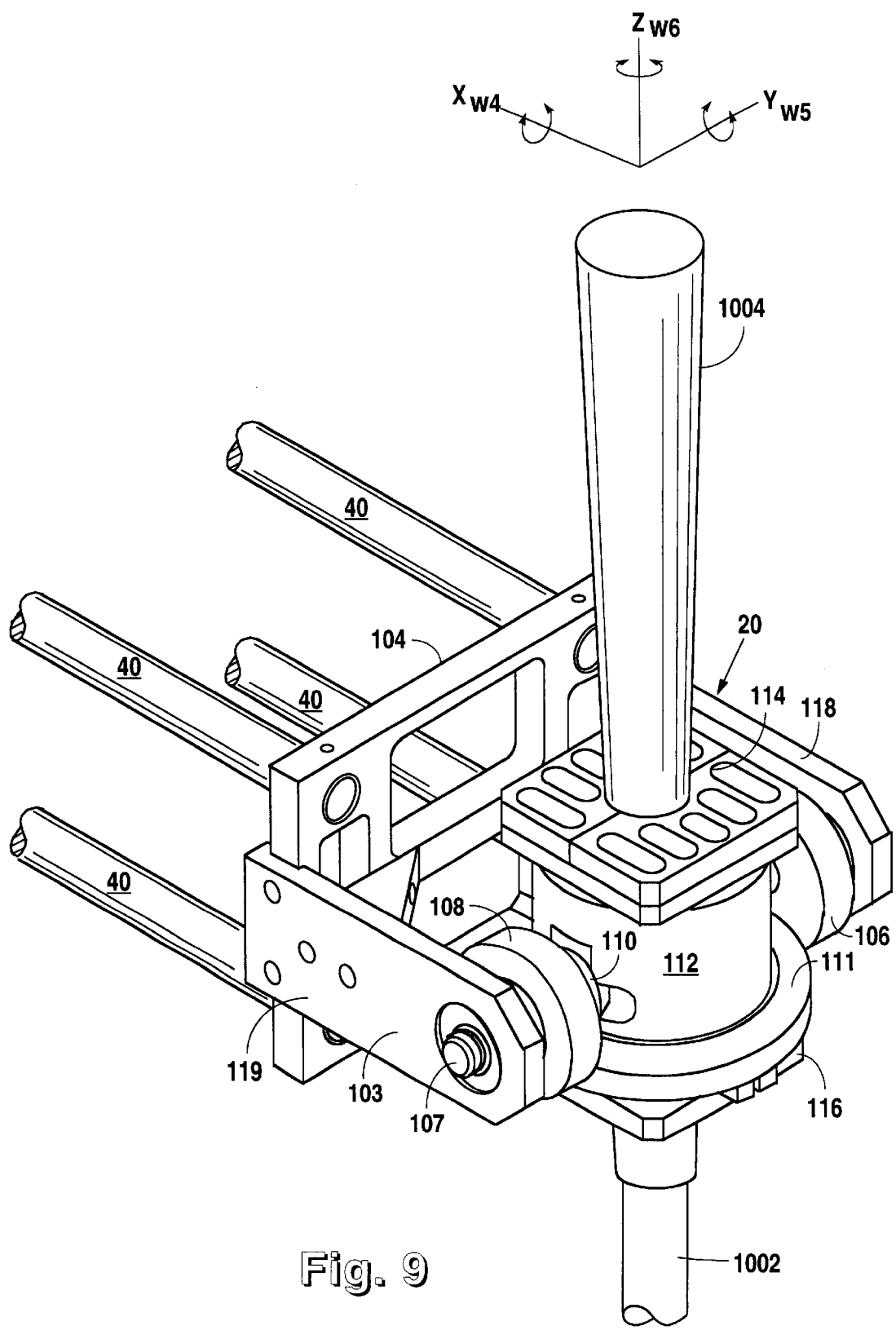
FIG. 9 is an enlarged perspective view of the wrist assembly.

A better understanding of the movement of the golf club 1000 as controlled by the wrist assembly 20 and with respect to the end of the support arm assembly 18 may be had by reference to FIGS. 4, 8, and 9. The rotation of the golf club 1000 about the $y_{w5}$ axis which controls the angular orientation or pitch is controlled by the action of the fifth position control actuator 32. The fifth position control actuator 32 is positioned and held against the support tubes 40 by mounting columns 94. Mounted to the end of the fifth position control actuator 32 is a pulley 96 which controls the linear motion of a cable (not shown). The cable engages a second pulley 106 which is mounted adjacent an arm 118 on the side of the yoke assembly 103 portion of the wrist assembly 20. Rotation of the golf club within the wrist assembly 20 or yaw about the $z_{w6}$ axis is controlled by the sixth position control actuator 34. As can be best seen in FIG. 8, the sixth position control actuator 34, is positioned by two mounting columns 102 which are affixed to the support rods 40. A cable assembly (not shown) extends from a third pulley on the end of the output shaft of the sixth position control actuator 34 to a fourth pulley 108 located at the pivot point 107 of the arm portion 119 of the yoke assembly 103. This cable assembly causes the fourth pulley 108 to turn. As the fourth pulley 108 turns, it causes a first beveled gear 110 to turn against a second beveled gear 111. The engagement of the first beveled gear 110 with the second beveled gear 111 changes the rotational position or yaw of the golf club 1000 about the $z_{w6}$ axis with the club holding collar 112. Holding the golf club grip 1004 in position with respect to the club holding collar 112 is an upper holding plate 114 and a lower holding plate 116 which may be tightened against the club grip 1004 by thumb screws (not shown).

While the preferred embodiment of the swing training and correction system includes a wrist assembly 20 positioned at the end of a support arm assembly 18 which in turn is positioned on a support column assembly 13, those of ordinary skill in the art will understand that a variety of different arrays of mechanical components may be used to provide computer controlled actuation along or about six degrees of freedom.

To control the arbitrary position and the orientation of the golf club through the entire swing, the mechanical manipulation mechanism must have at least six actuated axes. With proper configuration, these joints on these six actuated axes fully define the six degrees of freedom of the golf club in space: three with respect to Cartesian position and three with respect to angular orientation. Within the six degrees of freedom, many kinematic configurations are possible that fully constrain the position and orientation of the club. The preferred embodiment described herein consists of a serial link manipulator with a three degree of freedom arm assembly and three degree of freedom wrist assembly. The arm assembly has two revolute joints followed by a prismatic joint, and the wrist assembly has three coincident revolute joints. Other kinematic configurations are possible. For example, the second revolute joint and the prismatic joint on the arm assembly could be replaced by a single two degree of freedom cylindrical joint. Similarly, the function of the first two revolute joints on the arm assembly could be accomplished by a two degree of freedom spherical joint. Another feasible design would include six revolute joints. Such design would require removing the prismatic joint in the preferred embodiment. It will be still further understood that any one or any combination of the position control actuators may be unactuated to enable an analysis of the associated unactuated motion.

In the preferred embodiment the structural portions of the mechanical manipulation mechanism have been made of high grade aluminum (6000 or 7000 series). Exposed portions of the aluminum may be anodized for wear resistance and appearance enhancement.

Computer Control System Hardware:

The computer control system hardware preferably includes a Pentium II class PC running Windows NT software, a six-axis motion control system, and a servo amplifier for each one of the position control actuators. The six-axis motion control system includes on-board micro processor capabilities as found in the Galil 1700 Series. The control PC will have a graphical user interface to issue commands to the mechanical manipulation mechanism, to receive the input for swing parameters, and to display information about both the calculated swing and the actual swing. A standard Windows interface with menus and dialog boxes may be created to select the appropriate swing using the student's body parameters and then initiate the swing. After the motion completes, a graphical display may be used to show swing data such as velocity and torque, and offer the ability to save the data for later analysis.

Computer Control System Software:

The software operational speed requirements for accurate and stable control of a typical golf swing are demanding for most computerized robotic control systems. However, near real-time operating system performance can be achieved with a standard implementation of Windows NT through the use of a process priority system. This use of a process priority system in combination with the processing capabilities of the six-axis motion control system, provides the desired level of real-time operating system performance to keep up with a typical golf swing.

Processor-intensive tasks such as the inverse kinematic solution may be off loaded to the microprocessor on the six-axis motion control system. This offloading of the processor-intensive tasks to the six-axis motion control system allows the PC to concentrate on the high-level swing path selection tasks which are explained below.

Most commonly available motion control systems come with a C/C++ program language application programming interface (API). Accordingly, the controller code may be similarly written in C or C++ program language with a simple textual user interface. Data such as club velocity and club position are collected for later analysis.

The computer control system software allows the student golfer to swing the club along a desired path. Deviations or errors from this desired path are minimized with proportional counter-forces provided by the position control actuators. If the student golfer were to swing exactly along the desired path, then no forces would be applied to the golf club by the position control actuators of the mechanical manipulation mechanism. But as deviations from the desired swing path and associated club orientations become larger, greater force is applied to the club by the mechanical manipulation mechanism as a corrective action.

The computer control software is able to compensate for the mass of the mechanical manipulation mechanism, in part, by applying gravity compensating torques. These gravity compensating torques lower the apparent mass and inertia of the mechanical manipulation mechanism physically perceived by the student golfer. Similar gravity compensating torques may also be implemented by using coil springs or similar mechanical force biasing devices; for example, as shown by springs 68 on joint 2.

Computer Control System Software Design—General:

The design of the computer control software has been divided into two sections, low-level and high-level. The low-level section of the computer control software contains the instructions actually required to actuate the position control actuators to move the parts of the mechanical manipulation mechanism. The high-level section of the computer control software is the application specific program that allows the system to calculate and tailor the set of coordinates describing the position and orientation of the golf club throughout the desired golf swing path or geometry. An overview of the control software components is shown in FIG. 10.

Figure 10:
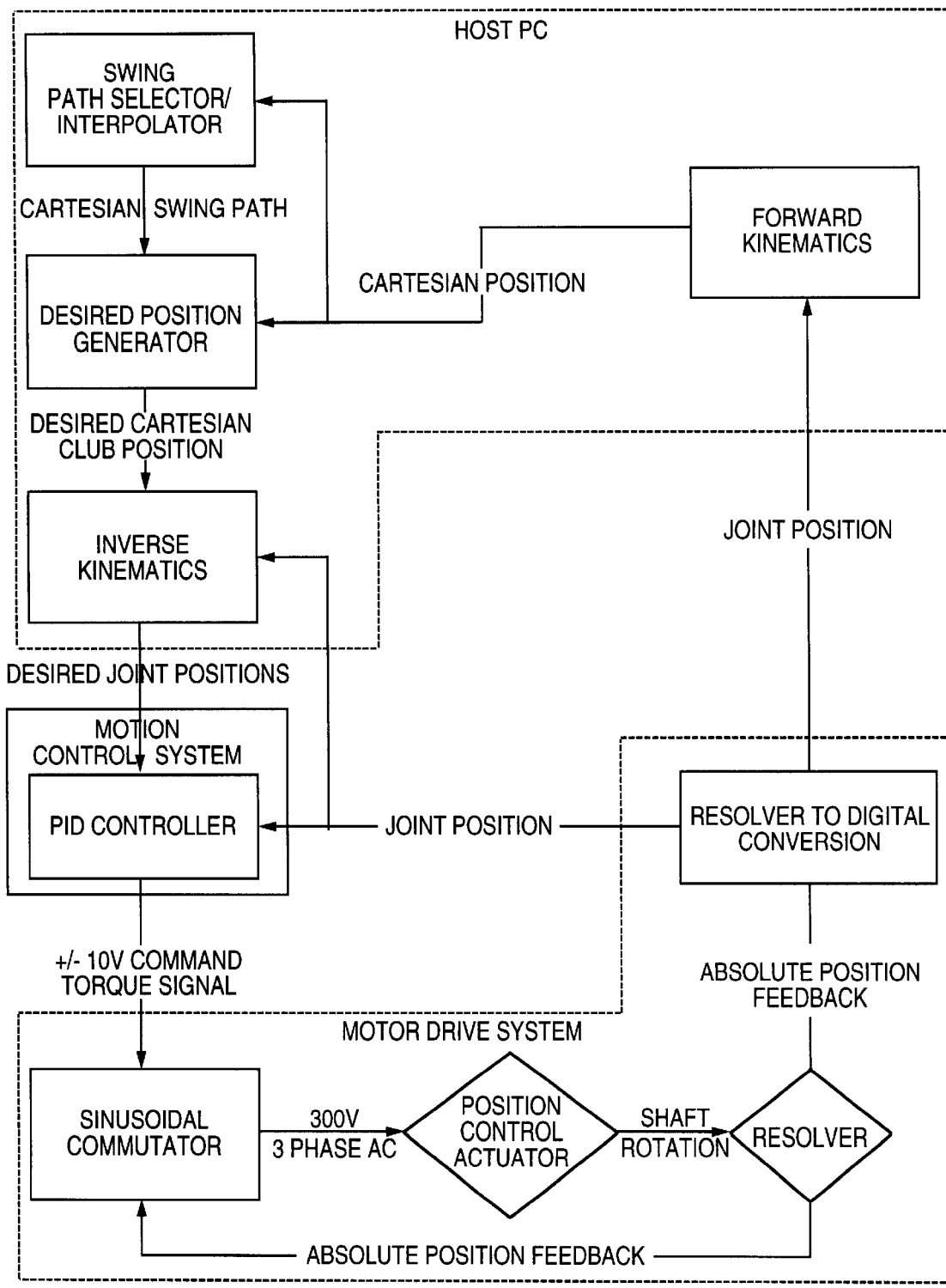
FIG. 10 is a block diagram of the macro operation of the control software.

By specific reference to FIG. 10, within the host PC a set of Cartesian coordinates describing a Cartesian Swing Path is generated by the Swing Path Selector/Interpolator. This set of Cartesian coordinates from the Swing Path Selector/Interpolator is combined with the actual Cartesian position coordinates from the Forward Kinematics Program in a Desired Position Generator program. The Desired Position Generator program produces the instantaneous desired Cartesian coordinates of the club location and orientation during the entire swing path.

The actual angular position of each joint is sensed by a "sensor" at each position control actuator. The Forward Kinematics program calculates the current club position and orientation from these joint angles. Conversely, the Inverse Kinematics program calculates the desired joint position from the desired Cartesian coordinates.

The output of the Inverse Kinematics program is then fed to the six-axis Motion Control System. The PID Controller portion of the six-axis Motion Control System then provides the necessary signal to each of the position control actuators. It is the position control actuators which move the mechanical manipulation mechanism to provide the feedback forces on the golf club being swung. Thus, when the student golfer deviates from the desired swing path and associated club orientations, the forces on the golf club increase in direct proportion to the amount of deviation from the desired swing path and associated club orientations.

If desired, the signals provided to each position control actuator could be used to provide visual feedback such as a display on a CRT, a paper printout or activation of colored lights. Further, the signals could also be used to provide auditory feedback such as a buzzer or a horn.

High-Level Software Section:

The high-level section of the control software is used for the selection of the coordinates describing the path and orientation of the club during the desired golf swing. The high level section of the computer control software is used to maintain a database of swing path and club orientation that are recorded from the swings of skilled golfers or from a swing path specially created for an individual golfer; for instance, by a teaching golf professional. These databases of coordinates describing a swing path and club orientation are stored as homogeneous transformations in a binary tree data structure. The binary tree data structure includes three position variables and a set of Z-Y-Z Euler angles for describing the orientation of the golf swing. Use of a binary tree data structure to contain the position data permits fast ($\log_2 n$) searches of the Cartesian coordinates that describe the path and club orientation during the entire golf swing. The initial path for the described golf swing for the student golfer will be chosen based on a set of parameters that describes the size, shape and location of the student golfer's swing.

Figure 11:
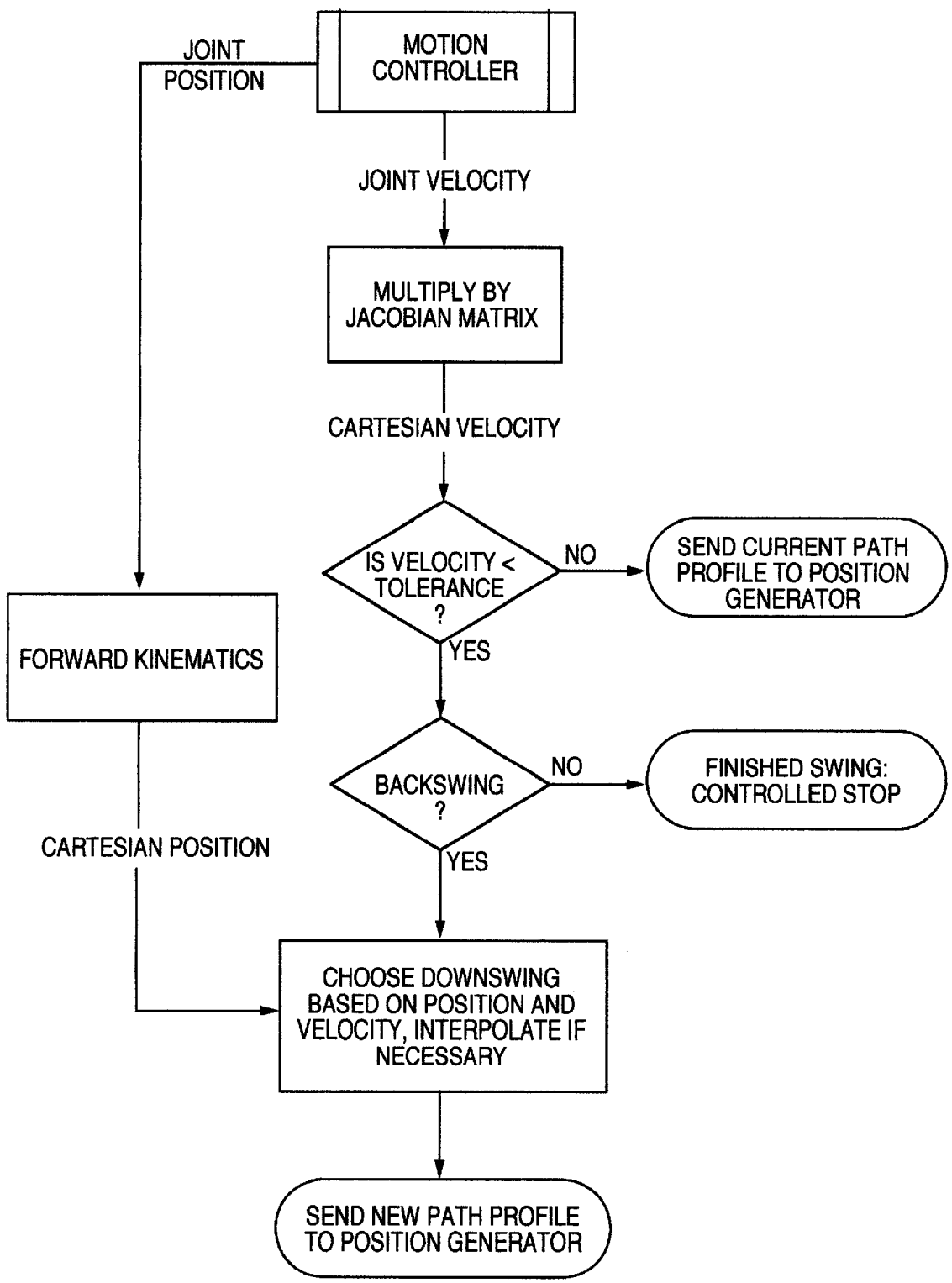
FIG. 11 is a block diagram showing the operation of the high-level swing path selection software.

Once the golf swing has been initiated, the path selection logic follows the high level software section shown in FIG. 11. This software module controls the desired path of the golf swing based on the golf club's position, orientation, and velocity. For example, the student golfer may take only a half back swing. A half back swing requires a different forward swing than that used for a full back swing. Similarly, the speed of the forward swing may affect the swing path chosen. Consequently, the swing path selection must be made in real time during the actual golf swing. In order to minimize the number of possible swing choices, interpolation will be employed to create the necessary paths from a simplified data set.

After the desired golf swing path and associated club orientations have been selected, the computer control system must choose the desired position. The logic for choosing the desired position is shown in the low level software section depicted in FIG. 12. This software module simply chooses the desired position to be the nearest point on the desired swing path as defined by the normal between the actual position of the golf club and the desired swing path and associated club geometry.

In FIG. 11 it may be seen that the six-axis Motion Control System produces two outputs: i) a set of data representing the position of each of the six joints, and ii) a set of data representing velocity of each of the six joints. The joint velocity data is multiplied by the Jacobian matrix and transformed into a set of data describing a Cartesian velocity. The joint position data is then sent to the Forward Kinematics Program and a set of data representing Cartesian coordinates for club position and orientation is produced.

The Cartesian velocity of the six joints is sent to a decision node where it is determined if the Cartesian velocity is more or less than a predetermined tolerance velocity level. If the Cartesian velocity is not less than the predetermined tolerance velocity level, the correct swing path or geometry profile is sent to the position generator shown in FIG. 10. If the Cartesian velocity is less than the predetermined tolerance velocity level, the next module determines whether or not the golf club is in the backswing portion of the golf swing. If not, the system determines that the swing has been finished and a controlled stop is made. If the club is in the backswing portion of the swing, the software chooses the desired downswing profile based on the Cartesian coordinate position and orientation and its Cartesian velocity. If necessary, needed Cartesian coordinates for club position and orientation are obtained by interpolation. The newly generated Cartesian coordinates describing the club position and orientation are sent to the position generator.

Figure 12:
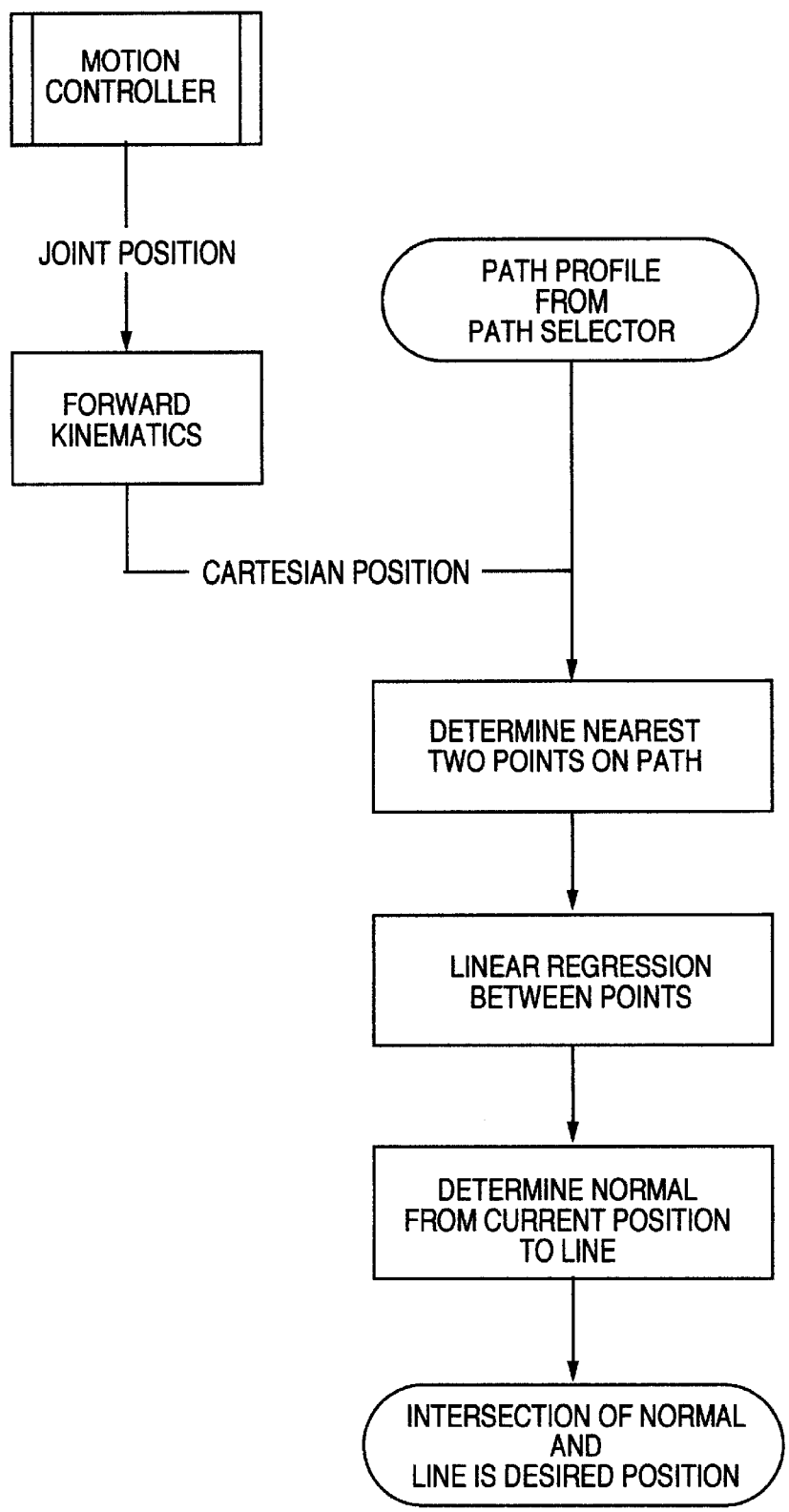
FIG. 12 is a block diagram showing operation of the low-level swing motion control software.

As shown in FIG. 12, the Motion Controller produces a data set representing the position of each joint. This output of joint position is fed to the Forward Kinematics software module to produce an output of Cartesian coordinate positions. This output of Cartesian coordinate positions and orientations is combined with a Path Profile from the Path Profile Selector. This combination is used to determine the nearest two points on the golf swing path. These two points are then used to produce a linear regression between the two points. Once this linear regression is produced, a normal vector from the current golf club position to the desired swing path or geometry is produced and the desired position is obtained from the intersection of this normal vector and the desired swing path or geometry. The equation for this normal vector is:

$$\vec{n} = \vec{r}_o - \frac{(\vec{r}_1 - \vec{r}_o) \times \vec{a} \times \vec{a}}{a^2}$$

where $\vec{n}$ is the normal vector, $\vec{r}_o$ is the vector to the current position, $\vec{r}_1$ is the vector to the first point on the desired swing path or geometry, and $\vec{a}$ is the vector from a first point to a second point on the desired swing path or geometry. Using a Galil DMC1760 motion controller, or its equivalent under its continuous contouring mode, this desired position can be directly applied to the servo loop without performing any velocity profiling.

Low-Level Software Section:

The major component of the low level software section is the Inverse Kinematic program. The Inverse Kinematic program computes the angles for each of the six joints given a particular position and orientation of the golf club during the swing path or geometry. The angles $\theta_1$, $\theta_2$, and $\theta_3$ for joints 1, 2, and 3, respectively, are calculated using the following three equations:

$$\theta_1 = \tan^{-1}\left(\frac{y}{x}\right)$$

$$\theta_3 = \sqrt{x^2 + y^2 + z^2 - a^2}$$

$$\theta_2 = \tan^{-1}\left(\frac{\theta_3}{a}\right) - \tan^{-1}\left(\frac{\sqrt{x^2 + y^2}}{z}\right)$$

where x, y, and z represent positions along the $z_{a1}$, $y_{a2}$ and $x_{a3}$ axes. The letter 'a' represents the Denavit-Hartenberg parameter that describes the perpendicular distance between axes $y_{a2}$ and $x_{a2}$.

The angles for joints 4, 5 and 6, $\theta_4$, $\theta_5$, and $\theta_6$, respectively, are determined from a set of Z-Y-Z Euler angles. Given a homogeneous transformation using the parameters n, o, and a as defined on page 70 in Paul's 1981 text on robotics, *Robotic Manipulators: Mathematics, Programming and Control*, published by MIT Press, the equations for the angles for joints 4, 5 and 6 are:

$$\theta_5 = \tan^{-1}\left(\frac{a_x \cos(\theta_4) + a_y \sin(\theta_4)}{a_z}\right)$$

$$\theta_4 = \tan^{-1}\left(\frac{a_y}{a_x}\right)$$

$$\theta_6 = \tan^{-1}\left(\frac{-n_x \sin(\theta_4) + n_y \cos(\theta_4)}{-o_x \sin(\theta_4) + o_y \cos(\theta_4)}\right)$$

The Forward Kinematics program and multiplication by the Jacobian matrix are a direct application of the transformation matrices for each joint. The Forward Kinematics program is simply the pre-multiplication of each transformation to create the transformation from joint angles to coordinates representing club position and orientation. The Jacobian solution is the 6×6 matrix of partial derivatives from the Forward Kinematics program.

The actual servo loop is performed by the six-axis motion control system and uses standard proportional-integral-differential feed-forward (PID-FF) model. The three PID gains are average values determined experimentally for a nominal workspace. The velocity and acceleration feed forward components are used to increase stability and enhance the performance characteristics of the computer control system.

While the present invention has been described giving reference to its preferred embodiment, it will be understood by those of ordinary skill in the art that numerous other embodiments of the present invention have now been enabled. Such other embodiments shall be included within the scope and meaning of the appended claims.

What is claimed is:

1. An implement swing training and correction system for use by a student athlete comprising:

means for storing multiple sets of Cartesian coordinates representing a collection of predetermined individual implement swing path positions and implement orientations;

means for selecting one of said individual predetermined individual implement swing path positions and implement orientations and transforming said selected individual predetermined implement swing path positions and implement orientations into a system of Cartesian coordinates representing a tailored swing path geometry conforming to the physiology of the student athlete;

a computer controlled mechanical system constructed and arranged to control the position and orientation of the implement along said tailored swing path geometry;

means for providing force feedback to the student athlete when the swing path geometry imparted to the implement by the student athlete deviates from said tailored swing path geometry;

said force feedback being in direct relation to the amount of deviation of the swing path geometry from said tailored swing path geometry.

2. The system as defined in claim 1 wherein said tailored swing path geometries are homogeneous transformations stored in a binary tree data structure.

3. The system as defined in claim 1 wherein the positions and orientations of the implement are determined by a computer controlled mechanical system wherein said computer controls the motion of said mechanical system in six degrees of freedom.

4. The system as defined in claim 3 wherein three of said six degrees of freedom are associated with an arm assembly and the remaining three of said six degrees of freedom are associated with a wrist assembly mounted on one end of said arm assembly.

5. The system as defined in claim 4 wherein said three degrees of freedom associated with said arm assembly are oriented along an $x_a$ axis, a $y_a$ axis, and a $z_a$ axis on a Cartesian coordinate system.

6. The system as defined in claim 5 wherein said three degrees of freedom associated with said wrist assembly are oriented along an $x_w$ axis, a $y_w$ axis, and a $z_w$ axis on a Cartesian coordinate system.

7. The system as defined in claim 6 wherein said three degrees of freedom associated with the wrist assembly include at least one revolute joint.

8. The system as defined in claim 7 wherein said at least one revolute joint permits rotation of the implement about its own long axis.

9. The system as defined in claim 5 wherein said three degrees of freedom associated with the arm assembly include at least one revolute joint.

10. The system as defined in claim 9 wherein a revolute joint is oriented along said $z_a$ axis.

11. The system as defined in claim 9 wherein a revolute joint is oriented along said $y_a$ axis.

12. The system as defined in claim 5 wherein said three degrees of freedom associated with the arm assembly include at least one prismatic joint.

13. The system as defined in claim 12 wherein said prismatic joint is oriented along said $x_a$ axis.

14. The system as defined in claim 3 wherein a position control actuator is associated with each of said six degrees of freedom.

15. The system as defined in claim 1 wherein the force feedback is provided by position control actuators.

16. The system as defined in claim 1 wherein the position of the implement in either backswing or downswing is determined by the velocity of the implement.

17. A six axis athletic implement swing training and correction system comprising:

a first support assembly oriented along a $z_a$ axis;

a second support assembly rotatable about a $y_a$ axis and extending along an $x_a$ axis and mounted on one end to said first support assembly;

a third support assembly mounted on a second end of said second support assembly at the intersection of $x_w$, $y_w$, and $z_w$ axes;

a first position control actuator for controlling rotation of said first support assembly about said $z_a$ axis;

a second position control actuator for controlling rotation of said second support assembly about said $y_a$ axis;

a third position control actuator for controlling translation of said second support assembly along said $x_a$ axis;

a fourth position control actuator for controlling the rotation of said third support assembly about said $x_w$ axis;

a fifth position control actuator for controlling the rotation of said third support assembly about said $y_w$ axis;

a sixth position control actuator for controlling the rotation of said third support assembly about said $z_w$ axis;

said third support assembly including means for gripping the athletic implement around its long axis;

a programmable computer system connected to each of said position control actuators to position the athletic implement at a predetermined location and orientation, during the swing of the athletic implement.

18. The system as defined in claim 17 further including means for placing force on the athletic implement if the position and orientation of said athletic implement deviates from said predetermined locations and orientations.

19. The system as defined in claim 17 wherein said first support assembly is a substantially vertical support assembly.

20. The system as defined in claim 17 wherein said second support assembly is a support arm assembly.

21. The system as defined in claim 17 wherein said third support assembly is a wrist assembly.

22. A system for replicating the swing of an athletic implement having a long axis wherein said swing includes a predetermined series of implement positions and implement orientations, said system comprising:

a combination of position control actuators and joints in a mechanical manipulation mechanism enabling motion in six degrees of freedom wherein one of said six degrees of freedom is rotation about the long axis of the athletic implement;

a computer control system to both sense and record the position of the said mechanical manipulation mechanism along each of the six degrees of freedom during the athletic implement swing and to provide force feedback through said mechanical manipulation mechanism when the swing of the athletic implement deviates from the predetermined series of implement positions and implement orientations.

23. The system as defined in claim 22 wherein said computer control system records: the position of the athletic implement as a system of coordinates, the velocity of the athletic implement during the swing, and the torque associated with said position control actuators in said mechanical manipulation mechanism.

24. The system as defined in claim 23 wherein a position sensor is included for each position control actuator (or degree of freedom) to provide data on implement position, implement orientation, and implement velocity.

25. The system as defined in claim 22 wherein said computer control system compensates for the friction and inertia of said mechanical manipulation mechanism.

26. The system as defined in claim 22 wherein said computer control system using a proportional-integral-differential feed-forward filter of a six axis motion control system to determine the required torque from each position control actuator.

27. The system as defined in claim 22 wherein said computer control system further includes a low level software section and a high level software section.

28. The system as defined in claim 27 wherein said low level software section determines joint angles $\theta_1$, $\theta_2$, $\theta_3$, $\theta_4$, $\theta_5$, and $\theta_6$ associated with each of said six degrees of freedom.

29. The system as defined in claim 27 wherein said low level software section determines the joint angles $\theta_1$, $\theta_2$, $\theta_3$, $\theta_4$, $\theta_5$, and $\theta_6$ associated with the position and orientation of the athletic implement according to the following system of equations:

$$\theta_1 = \tan^{-1}\left(\frac{y}{x}\right)$$

$$\theta_3 = \sqrt{x^2 + y^2 + z^2 - a^2}$$

$$\theta_2 = \tan^{-1}\left(\frac{\theta_3}{a}\right) - \tan^{-1}\left(\frac{\sqrt{x^2 + y^2}}{z}\right)$$

$$\theta_4 = \tan^{-1}\left(\frac{a_y}{a_x}\right)$$

$$\theta_6 = \tan^{-1}\left(\frac{-n_x\sin(\theta_4) + n_y\cos(\theta_4)}{-o_x\sin(\theta_4) + o_y\cos(\theta_4)}\right)$$

$$\theta_5 = \tan^{-1}\left(\frac{a_x\cos(\theta_4) + a_y\sin(\theta_4)}{a_z}\right)$$

wherein x, y and z represent positions along the axes in a set of Cartesian coordinates, $a_x$ and $a_y$ are the x and y components of the Denavit-Hartenberg parameters and $n_x$, $n_y$, $o_x$, and $o_y$ are homogeneous transformation parameters.

30. The system as defined in claim 27 wherein said high level software section determines the desired athletic implement position and orientation on swing path based on the following equation:

$$\vec{n} = \vec{r}_o - \frac{(\vec{r}_1 - \vec{r}_o) \times \vec{a} \times \vec{a}}{a^2}$$

where $\vec{n}$ is the normal vector, $\vec{r}_o$ is the vector to the current position, $\vec{r}_1$ is the vector to the desired path and $\vec{a}$ is the vector from a first point to a second point on the desired swing path.

31. A method for training a student athlete on how to swing an athletic implement characterized by having a long axis, said method comprising the steps of:
describing a predetermined athletic implement swing path and athletic implement orientation along said swing path as a set of data representing positions in a Cartesian coordinate system;
storing said swing data in a computer;
transforming said swing path data into a tailored set of points representing positions in a Cartesian coordinate system, said tailored set of points conforming the swing to the size and muscular structure of the student athlete;
using said tailored set of points to control a mechanical manipulation mechanism to move the athletic implement through a set of positions and orientations describing a tailored swing path, said tailored swing path including rotation about the long axis of the athletic implement.

32. The method as described in claim 31 further includes the step of providing force feedback to the student athlete if the actual swing path deviates from said tailored swing path.

33. The method as described in claim 32 wherein the amount of force feedback is proportional to the amount of deviation of the actual swing path from said tailored swing path.

34. The method as described in claim 31 wherein said mechanical manipulation mechanism has six degrees of freedom.

35. The method as described in claim 34 wherein three degrees of freedom are associated with an arm assembly and three degrees of freedom are associated with a wrist assembly.

36. The method as defined in claim 35 wherein said three degrees of freedom associated with said arm assembly include at least one revolute joint.

37. The method as defined in claim 36 wherein said three degrees of freedom associated with said arm assembly include at least one prismatic joint.

38. The method as defined in claim 35 wherein said three degrees of freedom associated with said wrist assembly include three revolute joints.

39. The method as defined in claim 38 wherein at least one of said revolute joints permits rotation of the athletic implement about its own long axis.

40. The method as defined in claim 34 wherein said position control actuators are associated with each of said six degrees of freedom.

41. The method as defined in claim 31 wherein a position control actuator is associated with each of said six degrees of freedom.

42. The method as defined in claim 41 wherein said computer controls each position control actuator.

43. The method as defined in claim 31 wherein said force feedback is provided by position control actuators.

44. The method as defined in claim 31 wherein the position of the athletic implement in either backswing or downswing is determined by the velocity of the athletic implement.

* * * * *